United States Patent
Yang et al.

(10) Patent No.: US 9,668,214 B2
(45) Date of Patent: May 30, 2017

(54) METHOD AND DEVICE FOR ACQUIRING AND TRANSMITTING DATA BY AN STA IN A WIRELESS LOCAL AREA NETWORK

(71) Applicant: Huawei Technologies Co., Ltd., Shenzhen (CN)

(72) Inventors: Xun Yang, Shenzhen (CN); Bin Zhen, Shenzhen (CN); Mu Zhao, Shenzhen (CN); Yanping Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 14/573,819

(22) Filed: Dec. 17, 2014

(65) Prior Publication Data

US 2015/0146600 A1 May 28, 2015

Related U.S. Application Data

(63) Continuation of application No. PCT/CN2013/075175, filed on May 6, 2013.

(30) Foreign Application Priority Data

Jun. 18, 2012 (CN) .......................... 2012 1 0201041
Dec. 12, 2012 (CN) .......................... 2012 1 0535099

(51) Int. Cl.
*H04W 52/02* (2009.01)
*H04W 84/12* (2009.01)

(52) U.S. Cl.
CPC ... *H04W 52/0225* (2013.01); *H04W 52/0216* (2013.01); *H04W 84/12* (2013.01); *Y02B 60/50* (2013.01)

(58) Field of Classification Search
CPC ......... H04W 52/0225; H04W 52/0216; H04W 84/12; Y02B 60/50
See application file for complete search history.

(56) References Cited

U.S. PATENT DOCUMENTS

| | | | |
|---|---|---|---|
| 8,711,823 B2* | 4/2014 | Yeh | H04W 52/0216 370/338 |
| 2008/0176592 A1* | 7/2008 | Kakumaru | H04W 52/0216 455/512 |

(Continued)

FOREIGN PATENT DOCUMENTS

| | | |
|---|---|---|
| CN | 101252510 A | 8/2008 |
| CN | 101286980 A | 10/2008 |

(Continued)

*Primary Examiner* — Phuc Tran
(74) *Attorney, Agent, or Firm* — Brinks Gilson & Lione

(57) ABSTRACT

The present invention provides a method and device for acquiring and transmitting data by an STA in a wireless local area network. The method includes: transmitting, by the STA, a PS-Poll, and receiving downlink data returned by the AP upon receipt of the PS-Poll, in a reserved time period within a current beacon interval according to a TIM contained in a beacon, after learning that the AP has the downlink data of the STA according to the received beacon, wherein the reserved time period is a period of time interval within the beacon interval; retransmitting, by the STA, the PS-Poll after the reserved time period to acquire the downlink data, if the STA can not successfully receive the downlink data within the reserved time period. Through the above solution, a mechanism is provided to address a situation that unsuccessful receiving/transmission of data can not be handled.

22 Claims, 5 Drawing Sheets

--- the STA receives a beacon transmitted by the AP and transmits an uplink data packet in a corresponding time slot within a reserved time period indicated by the beacon — 801 the STA retransmits the uplink data packet after the reserved time period if the number of retransmissions of the data packet does not reach the maximum number of retransmissions, when the STA can not successfully transmit the uplink data packet in the specified time slot within the reserved time period — 802

(56) References Cited

U.S. PATENT DOCUMENTS

| | | | | |
|---|---|---|---|---|
| 2010/0214942 A1* | 8/2010 | Du | ...................... | H04L 43/0876 370/252 |
| 2012/0218979 A1* | 8/2012 | Yeh | ................... | H04W 52/0216 370/338 |
| 2015/0103710 A1* | 4/2015 | Lv | ..................... | H04W 74/0816 370/311 |
| 2015/0334592 A1* | 11/2015 | Choi | ................. | H04W 52/0216 370/311 |

FOREIGN PATENT DOCUMENTS

| | | |
|---|---|---|
| CN | 102013959 A | 4/2011 |
| CN | 102076067 A | 5/2011 |
| CN | 102386954 A | 3/2012 |
| EP | 2 485 436 A1 | 8/2012 |
| WO | WO 2007/137251 A3 | 11/2007 |
| WO | WO 2011/038531 A1 | 4/2011 |

\* cited by examiner

METHOD AND DEVICE FOR ACQUIRING AND TRANSMITTING DATA BY AN STA IN A WIRELESS LOCAL AREA NETWORK

CROSS-REFERENCE TO RELATED APPLICATIONS

This application is a continuation of International Application No. PCT/CN2013/075175, filed on May 6, 2013, which claims priority to Chinese Patent Application No. 201210201041.8, filed on Jun. 18, 2012 and Chinese Patent Application No. 201210535099.6, filed on Dec. 12, 2012 all of which are hereby incorporated by reference in their entireties.

FIELD OF THE INVENTION

The present invention relates to the technical field of communications, and particularly, to a method and a device for acquiring and transmitting data by an STA in a wireless local area network.

BACKGROUND OF THE INVENTION

In WLAN (Wireless Local Area Networks), since an STA (Station, station) is usually battery-powered, and energy is limited, according to MAC (Medium Access Control, medium access control) layer specification defined by IEEE802.11, an AP (Access Point, access point) periodically broadcasts a Beacon (beacon) in accordance with a BI (Beacon Interval), and the STA working in a power saving mode periodically is awakened and receives the beacon, wherein the beacon is a management frame used for notifying the STA of certain specific information, the beacon contains a data structure TIM (Traffic Indication Map, traffic indication map) used for notifying the STA whether the AP caches a data frame belonging to the STA; the TIM itself is a virtual bit mapping table composed of 2008 bits, each bit in the TIM corresponds to a specific STA, and a status of each bit represents whether the AP caches data of a STA corresponding to the bit.

A current 802.11ah application scenario contains an intelligent meter reading scenario supporting up to 6000 STAs. When a large number of STAs are awakened, a PS-Poll (power saving-polling) frame needs to be transmitted to acquire downlink data. The PS-Poll is a control frame transmitted by an STA and is used for acquiring data cached in an AP from the AP; and competition induced by a large number of PS-Polls leads to additional energy consumption on the STA with a low energy consumption requirement. Moreover, an Offloading STA and a Sensor STA coexist in the network, and the Sensor STA may become a hidden node of the Offloading STA due to such reasons as small transmission power and the like, so that the Sensor STA with the low energy consumption requirement is more likely to generate collision with the Offloading STA, resulting in multiple retransmissions which generate additional energy consumption.

To solve the above problems, a competition method based on time slots is provided in the prior art, and this method combines access based on time-slot division, with CSMA/CA (Carrier Sense Multiple Access/Collision Avoidance) and requires each STA to begin to compete for a channel in a time slot to which it belongs. In addition, a competition for transmission of a PS-Poll is distinguished from transmission of downlink data by an AP, and they are divided into different time periods separately: the STA competes for a PS-Poll in a specified time slot within a specific time period, and the AP transmits data in a specified time slot within another time period after the specific time period according to a sequence of receiving PS-Polls. Therefore, the PS-Polls are scattered and are transmitted separate from the downlink data, thereby reducing the conflict probability of the PS-Polls, moreover, the STA successfully competing for the channel may shift to sleep and is not awakened until the AP is about to send downlink data to it, thus reducing the waiting energy consumption.

Although the existing technical solution provides a scattered PS-Poll competition method, an appropriate handling mechanism is unavailable when the STA can not successfully receive the downlink data within the divided time period; and in addition, the existing algorithm can not handle the problem of data packet retransmission when transmission of uplink data based on time-slot division is unsuccessful. Therefore, when the PS-Poll is lost or goes wrong, an acknowledgement frame ACK of the PS-Poll is lost or goes wrong or DATA transmitted by the AP is lost or goes wrong, the SAT can not correctly acquire downlink data or send uplink data.

SUMMARY OF THE INVENTION

Embodiments of the present invention provide a method and a device for acquiring and transmitting data by an STA in a wireless local area network, which enable the STA in the wireless local area network to acquire/transmit data more timely and more accurately, thereby reducing the data loss rate.

An embodiment of the present invention provides a method for acquiring data by a station (STA) in a wireless local area network, for acquiring data by the STA from an access point (AP) which it accesses, including:

transmitting, by the STA, a PS-Poll, a Trigger or uplink data DATA transmitted by the STA and receiving downlink data returned by the AP upon receipt of the PS-Poll, the Trigger or the uplink data transmitted by the STA, in a reserved time period within a current beacon interval according to a traffic indication map (TIM) contained in a beacon, after learning that the AP has the downlink data of the STA according to the received beacon; retransmitting, by the STA, the PS-Poll, the Trigger or the uplink data transmitted by the STA after the reserved time period to acquire the downlink data, if the STA can not successfully receive the downlink data within the reserved time period.

An embodiment of the present invention also provides a data acquisition device, configured to acquire data from an access point (AP) in a wireless local area network, including:

a first transceiving unit, configured to, transmit a PS-Poll, a Trigger or uplink data DATA transmitted by the STA and receive downlink data returned by the AP upon receipt of the PS-Poll, the Trigger or the uplink data DATA transmitted by the STA, in a reserved time period within a current beacon interval according to a traffic indication map (TIM) contained in a beacon, after learning that the AP has the downlink data of the STA according to the received beacon from the AP, wherein the reserved time period is a period of time interval within the beacon interval; and a second transceiving unit, configured to, retransmit the PS-Poll, the Trigger or the uplink data transmitted by the STA after the reserved time period to acquire the downlink data, when the first transceiving unit can not successfully receive the downlink data within the reserved time period.

An embodiment of the present invention provides a method for transmitting data by a station (STA) in a wireless local area network, for transmitting data by the STA from an access point (AP) which it accesses, including:

receiving, by the STA, a beacon transmitted by the AP, and transmitting an uplink data packet in a corresponding time slot within a reserved time period indicated by the beacon; and retransmitting, by the STA, the uplink data packet after the reserved time period if the number of retransmissions of the uplink data packet does not reach the maximum number of retransmissions, when the STA can not successfully transmit the uplink data packet within the reserved time period.

Through the above technical solutions, the embodiments of the present invention provide a new mechanism to allow an STA to compete for a channel again to acquire downlink information or transmit uplink information, addressing a situation that unsuccessful receiving/transmission of data can not be handled during access to a CSMA/CA channel based on time slots. When the STA learns that there is its own downlink data or the STA is allowed to transmit uplink data, but does not correctly acquire its own downlink data or does not correctly transmit the uplink data in a specified time slot within a current time period, the STA reselects another time slot after the time period to retransmit a PS-Poll, a Trigger or uplink data DATA transmitted by the STA to acquire data or retransmit the uplink data, so that the STA can still acquire or transmit data correctly when the PS-Poll, the Trigger or the uplink data DATA transmitted by the STA is lost or goes wrong, an ACK of the PS-Poll, the Trigger or the uplink data DATA transmitted by the STA is lost or goes wrong, DATA transmitted by the AP is lost or go wrong, or an ACK of the uplink data packet is lost, improving the reliability of data transmission between the STA and the AP.

BRIEF DESCRIPTION OF THE DRAWINGS

To illustrate technical solutions in the embodiments of the present invention clearer, a brief introduction on the accompanying drawings which are needed in the description of the embodiments is given below. Apparently, the accompanying drawings in the description below are merely some of the embodiments of the present invention, based on which other drawings may be obtained by those skilled in the art without any inventive efforts.

DETAILED DESCRIPTION OF THE EMBODIMENTS

A clear and complete description of technical solutions in the embodiments of the present invention will be given below, in combination with the accompanying drawings in the embodiments of the present invention. Apparently, the embodiments described below are merely a part, but not all, of the embodiments of the present invention. All of other embodiments, obtained by those skilled in the art based on the embodiments of the present invention without any inventive efforts, fall into the protection scope of the present invention.

Figure 1:
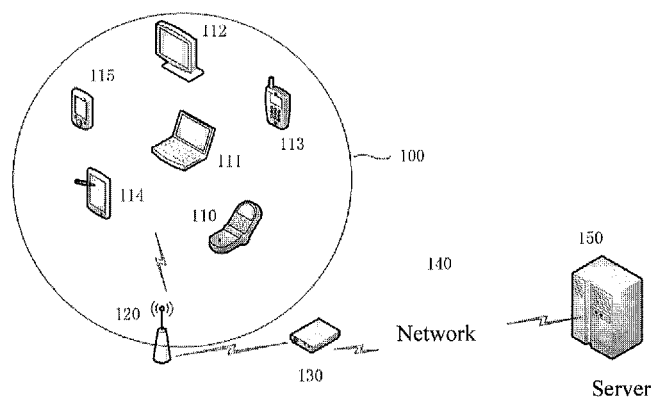
FIG. 1 is a network topology diagram of a network system provided by an embodiment of the present invention.

A first embodiment of the present invention provides a method for acquiring data by an STA in a wireless local area network, for acquiring data by the STA in the wireless local area network from an AP which it accesses. FIG. 1 is a structure diagram of a typical network topology employing the technical solutions of the present invention, according to FIG. 1, a wireless local area network 100 includes: an access point (AP, Access Point) 120 and stations (STA, Station) 110-115 accessing the network through the access point 120, and the STAs 110-115 associated to the same AP 120 form a basic service set (BSS); the wireless local area network 100 accesses a backbone network 140 through a gateway 130, and then is connected to a server in the network.

It should be noted that, the STA in all embodiments of the present invention is a basic logical entity in the wireless local area network, and the STA specifically may be a terminal device containing a wireless local area network interface, for example, many mobile phones, tablet computers and the like on the current market support the wireless local area network interface, and a portable computer also have a built-in wireless local area network interface. For some devices having no wireless local area network interface, the wireless local area network interface may be provided by installing a WLAN wireless network card.

Figure 3:
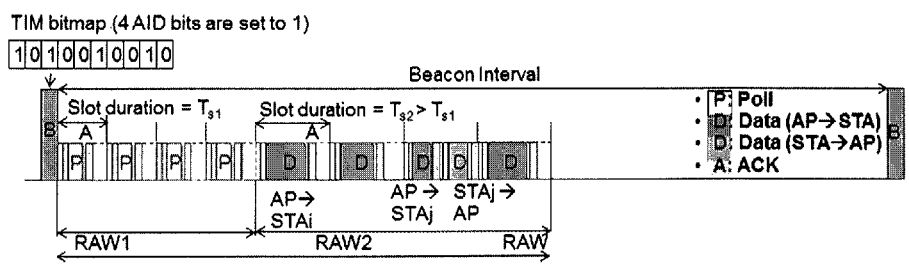
FIG. 3 is a schematic diagram of a method for acquiring data by an STA in a wireless local area network provided by an embodiment of the present invention.

It should also be noted that, in all embodiments of the present invention, a "reserved time period" is defined as a time interval obtained by subdividing the beacon interval. RAW as shown in FIG. 3 is a reserved time period, and RAW1 and RAW2 are a part of the reserved time period RAW; further, one "reserved time period" may be subdivided into smaller time intervals, referred to as "time slots". In the embodiments of the present invention, the time slot is a minimum time unit used for transmitting and receiving a data frame, a control frame or a management frame. Meanwhile, it may be understood for those skilled in the art that one beacon interval may be divided into two or more reserved time periods, and each reserved time period may be subdivided into a plurality of smaller time slots.

Figure 2:
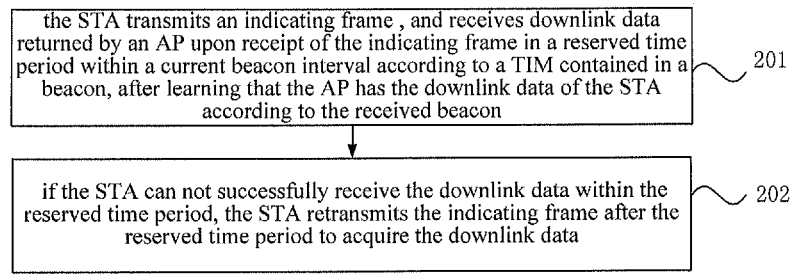
FIG. 2 is a flowchart of a method for acquiring data by an STA in a wireless local area network provided by an embodiment of the present invention.

FIG. 2 shows a flowchart of a method for acquiring data by an STA in a wireless local area network provided by an embodiment of the present invention. According to the FIG. 2, the method includes:

step 201, the STA transmits a PS-Poll, a Trigger (trigger frame) or uplink data DATA transmitted by the STA (the PS-Poll, the Trigger or the uplink data DATA transmitted by the STA may be referred to as an indicating frame), and receives downlink data returned by an AP upon receipt of the indicating frame in a reserved time period within a current beacon interval according to a TIM contained in a beacon, after learning that the AP has the downlink data of the STA according to the received beacon.

Specifically, as shown in FIG. 3, in one embodiment, the specific implementation process of the step 201 is described as follows: after the AP transmits the Beacon, a part of time period (a reserved time period RAW1 as shown in FIG. 3) is reserved within the current beacon interval for the STA to transmit the PS-Poll, the Trigger or the uplink data DATA transmitted by the STA; after the RAW1, a part of time period (a reserved time period RAW2 as shown in FIG. 3) is reserved for the AP to transmit downlink data to the STA; only the STA an identifier of which is 1 in the TIM contained in the current Beacon is allowed to send the PS-Poll, the Trigger or the uplink data DATA transmitted by the STA in a specified first time slot in the RAW1, the STA successfully transmitting the PS-Poll, the Trigger or the uplink data DATA transmitted by the STA may shift to a sleep mode and wakes up in a corresponding second time slot in the RAW2 to receive the downlink data; after receiving the PS-Poll, the Trigger of the STA or the uplink data DATA transmitted by the STA, the AP schedules the transmission of the downlink data in the RAW2, wherein according to the foregoing definition, the first time slot and the second time slot are specified time intervals within the reserved time period, and the lengths of the first time slot and the second time slot may be flexibly defined according to an actual demand; for example, in one preferable embodiment of the present invention, the length of the first time slot may be TS1=PS-Poll+SIFS+ACK, and the length of the second time slot may be TS2=DATA+SIFS+ACK.

In the step 201 in the embodiment of the present invention, the PS-Poll, the Trigger or the uplink data DATA transmitted by the STA are transmitted and the downlink data are received respectively in corresponding time slots within two different reserved time periods; and it may be understood for those skilled in the art that, the PS-Poll, the Trigger or the uplink data DATA transmitted by the STA may be transmitted and the downlink data may be received in two different time slots within one reserved time period as well.

Step 202, if the STA can not successfully receive the downlink data within the reserved time period, the STA retransmits the PS-Poll, the Trigger or the uplink data DATA transmitted by the STA after the reserved time period to acquire the downlink data.

Figure 4:
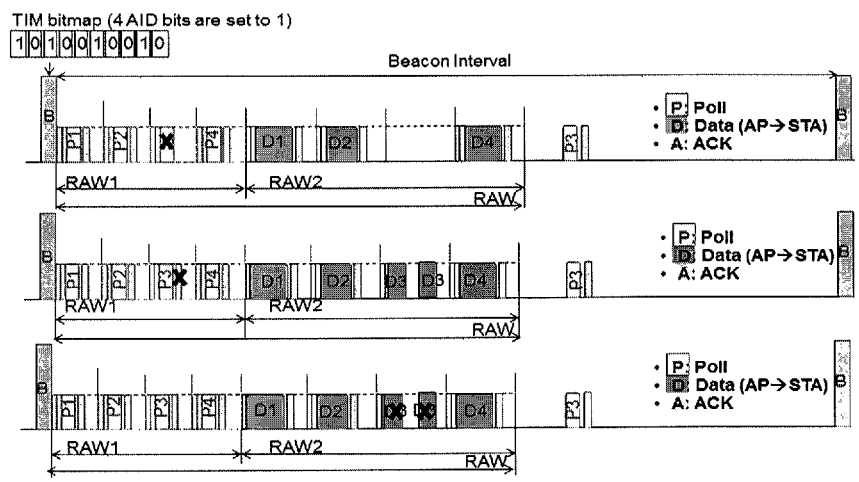
FIG. 4 is a schematic diagram of a method for acquiring data by an STA in a wireless local area network provided by an embodiment of the present invention.

Specifically, as shown in FIG. 4, in one embodiment, within a reserved time period (namely, RAW in FIG. 4), if the PS-Poll, the Trigger which are transmitted by the STA or the uplink data DATA transmitted by the STA, is lost or goes wrong (as shown in FIG. 4(a)), or an ACK of the PS-Poll, the Trigger or the uplink data DATA transmitted by the STA is lost or goes wrong (as shown in FIG. 4(b)), or DATA transmitted by the AP is lost or goes wrong (as shown in FIG. 4(c)), the STA can not successfully receive data in the specified time slot within the reserved time period RAW. At this time, if the number of retransmissions of the PS-Poll (may be a set parameter and is generally 7) by the STA does not reach the maximum number of retransmissions, the STA selects a corresponding time slot from another reserved time period after the reserved time period RAW within the current Beacon interval to retransmit the PS-Poll, the Trigger or the uplink data DATA transmitted by the STA to acquire the downlink data. Wherein, the reserved time period divided in the Beacon Interval may be referred to as RAW (Restricted Access Window, restricted access window), but is not limited to the name.

Further, as an embodiment, when the STA can not successfully receive data in the specified time slot within the reserved time period RAW, the STA selects a corresponding time slot from another reserved time period after the reserved time period RAW within the current Beacon interval to retransmit the PS-Poll, the Trigger or the uplink data DATA transmitted by the STA to acquire the downlink data. In the specific implementation, whether the number of retransmissions of the PS-Poll by the STA reaches the maximum number of retransmissions may be not taken into account.

In the embodiment, one possible reason why the STA can not successfully receive data in the specified time slot within the reserved time period RAW lies in that the STA fails to transmit the PS-Poll, the Trigger or the uplink data DATA transmitted by the STA in the reserved time slot and thus fails to correctly acquire data. For example, the transmission fails because the transmission time of the PS-Poll, the Trigger or the uplink data DATA transmitted by the STA or the receiving time of an ACK of the PS-Poll, the Trigger or the uplink data DATA transmitted by the STA can not exceed a boundary of a set time slot. Or, for example, the transmission fails because the number of retransmissions of the PS-Poll, the Trigger or the uplink data DATA transmitted by the STA reaches the preset number of retransmissions. Another possible reason why the STA can not successfully receive data in the specified time slot within the reserved time period RAW lies in that the AP fails to transmit the downlink data, for example, the data are not received correctly, the ACK transmitted by the STA is not received correctly, or the data or the ACK can not be retransmitted due to reaching the limited boundary of the time slot.

Correspondingly, the AP at least keeps the data to be transmitted to the STA before the current Beacon Interval ends.

Figure 5:
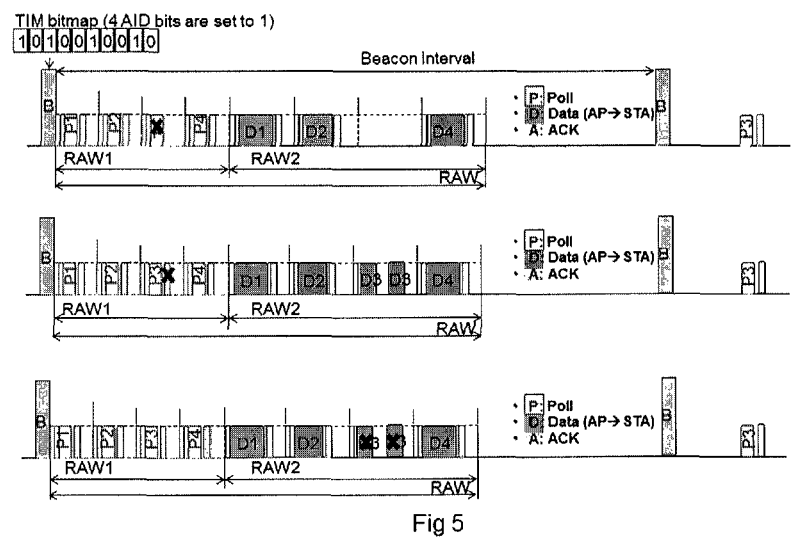
FIG. 5 is a schematic diagram of a method for acquiring data by an STA in a wireless local area network provided by an embodiment of the present invention.

In another embodiment of the present invention, as shown in FIG. 5, within a reserved time period RAW, when the PS-Poll, the Trigger which are transmitted by the STA or the uplink data DATA transmitted by the STA is lost or goes wrong (as shown in FIG. 5(a)), or an ACK of the PS-Poll, the Trigger or the uplink data DATA transmitted by the STA is lost or goes wrong (as shown in FIG. 5(b)), or DATA transmitted by the AP is lost or goes wrong (as shown in FIG. 5(c)), the STA can not successfully receive data in a corresponding time slot within the RAW. At this time, if the number of retransmissions of PS-Poll by the STA does not reach the maximum number of retransmissions, the STA selects a reserved time period in another Beacon interval after the current Beacon interval and retransmits the PS-Poll, the Trigger or the uplink data DATA transmitted by the STA in a corresponding time slot within the reserved time period to acquire downlink data, that is to say, in the embodiment, the STA is not limited to only retransmit the PS-Poll, the Trigger or the uplink data DATA transmitted by the STA within the current Beacon interval to acquire the downlink data, but is further extended to retransmit the PS-Poll, the Trigger or the uplink data DATA transmitted by the STA within other Beacon interval after the current Beacon interval.

Further, in another implementation, when the STA can not successfully receive data in a corresponding time slot within RAW, the STA selects a reserved time period in another Beacon interval after the current Beacon interval, and retransmits the PS-Poll, the Trigger or the uplink data DATA transmitted by the STA in a corresponding time slot within the reserved time period to acquire the downlink data.

Correspondingly, the AP should keep the data to be transmitted to the STA, until the STA correctly receives the data packet, or the number of retransmission of the data reaches the maximum number of retransmissions, or the data packet is discarded due to timeout.

In the implementation process of the present invention, the STA competes to transmit the PS-Poll, the Trigger or the uplink data DATA transmitted by the STA based on a DCF (distributed coordination function, Distributed Coordination Function) or EDCA (enhanced distributed channel access, Enhanced Distributed Channel Access) mechanism. When the time slot ends, and the STA stops retransmission of the unsuccessfully transmitted PS-Poll, Trigger or uplink data DATA transmitted by the STA, a corresponding DCF or EDCA status is frozen until the STA continues to compete based on the current DCF or EDCA status in a competition time period within the current BI or subsequent BI to continue to transmit the unsuccessfully transmitted PS-Poll, Trigger or uplink data DATA transmitted by the STA, or to retransmit the transmitted PS-Poll, Trigger or uplink data DATA transmitted by the STA, namely, again transmit the transmitted PS-Poll, Trigger or uplink data DATA transmitted by the STA which needs to be transmitted. Or, the STA calculates the allowable maximum number of retransmissions within the current time slot according to the time slot length and stops retransmission when the number of retransmissions is larger than the allowable maximum number of retransmissions within the current time slot, a corresponding DCF or EDCA status is frozen until the STA continues to compete based on the current DCF or EDCA status in a competition time period within the current BI or subsequent BI. In another manner, the STA calculates the allowable maximum number of retransmissions within the current time slot according to the time slot length, sets the allowable maximum number of retransmissions as the current maximum number of retransmissions and stops retransmission when the number of retransmissions within the current time slot reaches the maximum number of retransmissions, and a DCF status when the STA competes for a channel again is irrelevant to the DCF status before the retransmission stops.

Through the above technical solutions, the embodiments of the present invention provides a new mechanism to allow an STA to compete for a channel again to acquire downlink information, addressing a situation that unsuccessful receiving/transmission of data can not be handled during access to a CSMA/CA channel based on time slots. When the STA learns that there is its own downlink data but does not correctly acquire its downlink data in a specified time slot within a current time period, the STA reselects another time slot after the time period to retransmit a PS-Poll, a Trigger or uplink data DATA transmitted by the STA to acquire data, so that the STA can still acquire data correctly when the PS-Poll, the Trigger or the uplink data DATA transmitted by the STA is lost or goes wrong, an ACK of the PS-Poll, the Trigger or the uplink data DATA transmitted by the STA is lost or goes wrong, or DATA transmitted by an AP is lost or goes wrong, thereby improving the reliability of data transmission between the STA and the AP.

Second Embodiment

Figure 6:
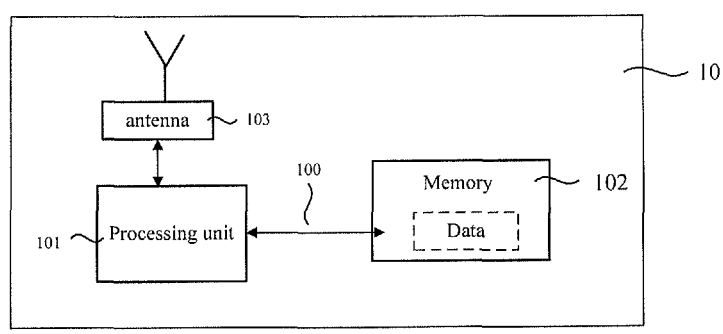
FIG. 6 is an exemplary diagram of a user equipment provided by an embodiment of the present invention.

The embodiment of the present invention further provides a device embodiment for implementing steps and methods in the above-mentioned method embodiments. The embodiment of the present invention may be applied in a variety of communication systems and particularly may be applied in the network system as shown in FIG. 1, for example, may be a user equipment or an STA. FIG. 6 shows a structural diagram of a user equipment. According to FIG. 6, the user equipment 10 includes: a processing unit 101, a memory 102 and an antenna 103. The processing unit 101 controls operations of the user equipment 10, and the processing unit 101 may also be referred to as CPU. The memory 102 may comprise a read-only memory and a random access memory, and is configured to provide instructions and data to the processing unit 101. A part of the memory 102 may also comprise a non-volatile random access memory (NVRAM). In a specific application, the user equipment 10 may be embedded into or itself may be a wireless communication device such as a wireless access point, a WiFi hotspot, a wireless router or the like. Components of the user equipment 10 are coupled together through a bus system 100, wherein the bus system also includes a power supply bus, a control bus and a status signal bus besides a data bus. However, for clear illustration, the varieties of buses are marked as the bus system 100 in the figure.

The method for acquiring data by an STA disclosed by the embodiments of the present invention may be applied in the user equipment 10 provided by the embodiment of the present invention, or is implemented by the user equipment 10. In the implementation process, the steps of the above-mentioned method may be implemented by an integrated logic circuit of hardware or software instructions of the user equipment 10. These instructions may be implemented and controlled by the processing unit 101 of the user equipment 10. For executing the method disclosed by the first embodiment of the present invention, the processing unit 101 may be a universal processor, a digital signal processor (DSP), an application specific integrated circuit (ASIC), a field programmable gate array (FPGA) or other programmable logic devices, a discrete gate or a transistor logic device and a discrete hardware component.

Specifically, in the user equipment 10 provided by the second embodiment of the present invention, the antenna 103 is configured to receive a beacon transmitted by an AP connected with the user equipment 10, wherein the beacon is a management frame for the AP to notify STA of certain specific information, and a time interval between two adjacent beacons transmitted by the AP is BI (Beacon Interval, beacon interval);

the processing unit 101, is configured to, transmit a PS-Poll, a Trigger or uplink data DATA transmitted by the STA, and receive downlink data returned by the AP upon receipt of the PS-Poll, the Trigger or the uplink data DATA transmitted by the STA in a reserved time period within a current beacon interval according to a traffic indication map (TIM) contained in the beacon, after learning that the AP has the downlink data of the user equipment 10 according to the beacon received by the antenna 103.

Further, the processing unit 101, is further configured to retransmit the PS-Poll, the Trigger or the uplink data DATA transmitted by the STA after the reserved time period to acquire the downlink data, when the downlink data may not be successfully received within the reserved time period.

Specifically, as shown in FIG. 4, in one embodiment, within a reserved time period (namely, RAW in FIG. 4), if the PS-Poll, the Trigger transmitted by the user equipment 10 or the uplink data DATA transmitted by the STA is lost or goes wrong (as shown in FIG. 4(a)), or an ACK of the PS-Poll, the Trigger or the uplink data DATA transmitted by the STA is lost or goes wrong (as shown in FIG. 4(b)), or DATA transmitted by the AP is lost or goes wrong (as shown in FIG. 4(c)), the user equipment 10 can not successfully receive data in the specified time slot within the reserved time period RAW. At this time, if the number of retransmissions of the PS-Poll by the user equipment 10 does not reach the maximum number of retransmissions, the processing unit 101 selects a corresponding time slot from another reserved time period after the reserved time period RAW within the current Beacon interval to retransmit the PS-Poll, the Trigger or the uplink data DATA transmitted by the STA to acquire the downlink data. Wherein, the reserved time period divided in the Beacon Interval may be referred to as RAW (Restricted Access Window, restricted access window), but is not limited to the name.

Correspondingly, the AP at least keeps the data to be transmitted to the user equipment 10 before the current Beacon Interval ends.

In another embodiment of the present invention, as shown in FIG. 5, within a reserved time period RAW, when the PS-Poll, the Trigger transmitted by the user equipment 10 or the uplink data DATA transmitted by the STA is lost or goes wrong (as shown in FIG. 5(a)), or an ACK of the PS-Poll, the Trigger or the uplink data DATA transmitted by the STA is lost or goes wrong (as shown in FIG. 5(b)), or DATA transmitted by the AP is lost or goes wrong (as shown in FIG. 5(c)), the user equipment 10 can not successfully receive data in a corresponding time slot within the RAW. At this time, if the number of retransmissions of the PS-Poll by the user equipment 10 does not reach the maximum number of retransmissions, the processing unit 101 selects a reserved time period in another Beacon interval after the current Beacon interval and retransmits the PS-Poll, the Trigger or the uplink data DATA transmitted by the STA in a corresponding time slot within the reserved time period to acquire the downlink data. That is to say, in the embodiment, the processing unit 101 is not limited to only retransmit the PS-Poll, the Trigger or the uplink data DATA transmitted by the STA within the current Beacon interval to acquire the downlink data, but is further extended to retransmit the PS-Poll, the Trigger or the uplink data DATA transmitted by the STA within other Beacon intervals after the current Beacon interval.

Correspondingly, the AP should keep the data to be transmitted to the user equipment 10 until the user equipment 10 correctly receives the data packet, or the number of retransmissions of the data reaches the maximum number of retransmissions, or the data packet is discarded due to timeout.

The memory 102 is configured to store data acquired by the processing unit 101.

Through the above technical solutions, the embodiment of the present invention provides a mechanism to handle a situation that an STA of downlink data can not successfully receive the downlink data within a divided time period. When the STA learns that there is its own downlink data but does not correctly acquire its downlink data in a specified time slot within a current time period, the STA reselects another time slot after the time period to retransmit a PS-Poll, a Trigger or uplink data DATA transmitted by the STA to acquire data, so that the STA can still acquire data correctly when the PS-Poll, the Trigger or the uplink data DATA transmitted by the STA is lost or goes wrong, an ACK of the PS-Poll, the Trigger or the uplink data DATA transmitted by the STA is lost or goes wrong, or DATA transmitted by the AP is lost or goes wrong, thereby improving the reliability of data transmission between the STA and the AP.

Third Embodiment

Figure 7:
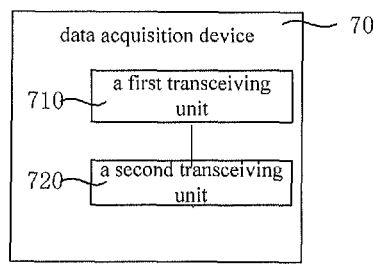
FIG. 7 is an exemplary diagram of a data acquisition device provided by an embodiment of the present invention.

The embodiment of the present invention provides a data acquisition device, configured to acquire data from an access point (AP) in a wireless local area network. As shown in FIG. 7, the device includes: a first transceiving unit 710 and a second transceiving unit 720;

wherein, the first transceiving unit 710 is configured to, transmit a PS-Poll, a Trigger or uplink data DATA transmitted by an STA, and receive downlink data returned by the AP upon receipt of the PS-Poll, the Trigger or the uplink data DATA transmitted by the STA in a reserved time period within a current beacon interval according to a TIM contained in a beacon, after learning that the AP has the downlink data according to the received beacon;

specifically, after receiving the Beacon, if an identifier corresponding to the data acquisition device 70 in the TIM contained in the current Beacon is 1, the first transceiving unit 710 transmits the PS-Poll, the Trigger or the uplink data DATA transmitted by the STA in a specified first time slot within the reserved time period. After successfully transmitting the PS-Poll, the Trigger or the uplink data DATA transmitted by the STA, the data acquisition device 70 may shift to a sleep mode and wakes up in a corresponding second time slot within the reserved time period to receive the downlink data; correspondingly, the AP schedules the transmission of the downlink data within the reserved time period after receiving the PS-Poll, the Trigger transmitted by the data acquisition device 70 or the uplink data DATA transmitted by the STA, wherein, according to the foregoing definition, the first time slot and the second time slot are specific time intervals within the reserved time period, and the lengths of the first time slot and the second time slot may be flexibly defined according to an actual demand; in one preferable embodiment of the present invention, the length of the first time slot may be TS1=PS-Poll+SIFS+ACK, and the length of the second time slot may be TS2=DATA+SIFS+ACK.

In addition, in the embodiment of the present invention, the first transceiving unit 710 respectively transmits the PS-Poll, the Trigger or the uplink data DATA transmitted by the STA and receives the downlink data in corresponding time slots within two different reserved time periods; it may be understood for those skilled in the art that, the first transceiving unit 710 may also transmit the PS-Poll, the Trigger or the uplink data DATA transmitted by the STA and receive the downlink data in two different time slots within one reserved time period, which is not described redundantly herein.

The second transceiving unit 720, is configured to retransmit the PS-Poll, the Trigger or the uplink data DATA transmitted by the STA after the reserved time period to acquire the downlink data, when the first transceiving unit 710 can not successfully receive the downlink data within the reserved time period.

In one embodiment, within a reserved time period, if the PS-Poll, the Trigger transmitted by the first transceiving unit 710 or the uplink data DATA transmitted by the STA is lost or goes wrong, or an ACK of the PS-Poll, the Trigger or the uplink data DATA transmitted by the STA is lost or goes wrong, or DATA transmitted by the AP is lost or goes wrong, the STA can not successfully receive data in the specified time slot within the reserved time period. At this time, if the number of retransmissions of the PS-Poll does not reach the maximum number of retransmissions, the second transceiving unit 720 selects a corresponding time slot from another reserved time period after the reserved time period within the current Beacon interval to retransmit the PS-Poll, the Trigger or the uplink data DATA transmitted by the STA to acquire the downlink data. Wherein, the reserved time period divided in the Beacon Interval may be referred to as RAW (restricted access window), but is not limited to the name.

In a further implementation, the second transceiving unit is specifically configured to suspend transmission of the indicating frame when the current reserved time slot ends; and continue to transmit the indicating frame to acquire the downlink data in another reserved time period after the reserved time period within the current beacon interval or within another beacon interval after the current beacon interval.

Or the second transceiving unit is specifically configured to terminate the transmission of the indicating frame when the current reserved time slot ends; and retransmit the indicating frame to acquire the downlink data in another reserved time period after the reserved time period within the current beacon interval or within another beacon interval after the current beacon interval.

Correspondingly, the AP at least keeps the data to be transmitted to the data acquisition device 70 before the current Beacon Interval ends. The above-mentioned first transceiving unit 710 and second transceiving unit 720 may be a user equipment or a logical unit in a processor unit in the STA, or directly implemented by the processor unit.

In another embodiment of the present invention, within a reserved time period, when the PS-Poll, the Trigger transmitted by the first transceiving unit 710 or the uplink data DATA transmitted by the STA is lost or goes wrong, or an ACK of the PS-Poll, the Trigger or the uplink data DATA transmitted by the STA is lost or goes wrong, or DATA transmitted by the AP is lost or go wrong, the first transceiving unit 710 can not successfully receive data in a corresponding time slot within the reserved time period. At this time, if the number of retransmissions of the PS-Poll does not reach the maximum number of retransmissions, the second transceiving unit 720 selects a reserved time period in another Beacon interval after the current Beacon interval and retransmits the PS-Poll, the Trigger or the uplink data DATA transmitted by the STA in a corresponding time slot within the reserved time period to acquire the downlink data. That is to say, in the embodiment, the second transceiving unit 720 is not limited to only retransmit the PS-Poll, the Trigger or the uplink data DATA transmitted by the STA within the current Beacon interval to acquire the downlink data, but is further extended to retransmit the PS-Poll, the Trigger or the uplink data DATA transmitted by the STA within other Beacon intervals after the current Beacon interval.

Correspondingly, the AP should keep the data to be transmitted to the data acquisition device 70, until the data acquisition device 70 correctly receives the data packet, or the number of retransmissions of the data reaches the maximum number of retransmissions, or the data packet is discarded due to timeout.

Through the above technical solutions of the embodiment of the present invention, when a data acquisition device learns that there is its own downlink data but does not correctly acquire its downlink data in a specified time slot within a current time period, the data acquisition device reselects another time slot after the time period to retransmit a PS-Poll, a Trigger or uplink data DATA transmitted by the STA to acquire data, so that the STA can still acquire data correctly when the PS-Poll, the Trigger or the uplink data DATA transmitted by the STA is lost or goes wrong, an ACK of the PS-Poll, the Trigger or the uplink data DATA transmitted by the STA is lost or goes wrong, or DATA transmitted by the AP is lost or goes wrong, thereby improving the reliability of data transmission between the STA and the AP.

Fourth Embodiment

Figure 8:
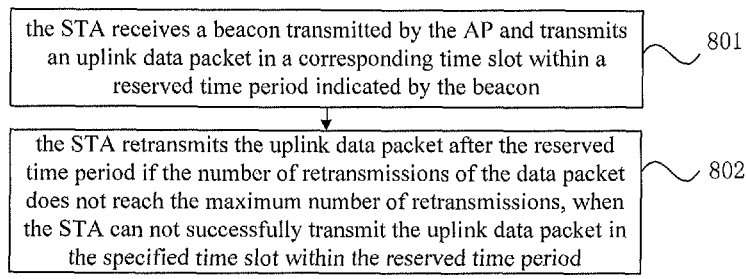
FIG. 8 is a flowchart of a method for transmitting data by an STA in a wireless local area network provided by an embodiment of the present invention.

The embodiment of the present invention further provides a method for transmitting data by an STA in a wireless local area network, for transmitting uplink data by the STA in the wireless local area network to an AP which it accesses. FIG. 8 is a flowchart of a method for acquiring data by an STA in a wireless local area network provided by the embodiment of the present invention. According to the FIG. 8, the method includes:

step 801, the STA receives a beacon transmitted by the AP and transmits an uplink data packet in a corresponding time slot within a reserved time period indicated by the beacon; wherein the time slot is a period of time interval in the reserved time period within the current beacon interval; and step 802, the STA retransmits the uplink data packet after the reserved time period if the number of retransmissions of the data packet does not reach the maximum number of retransmissions, when the STA can not successfully transmit the uplink data packet in the specified time slot within the reserved time period.

Figure 9:
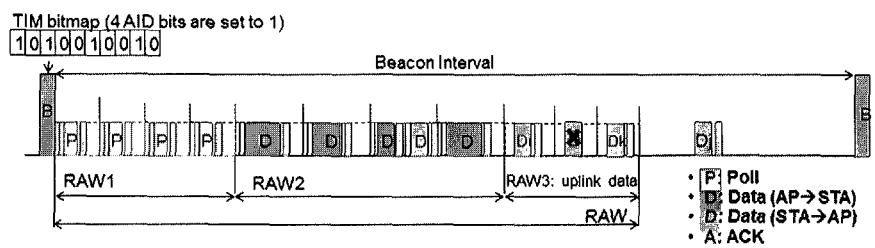
FIG. 9 is a schematic diagram of a method for transmitting data by an STA in a wireless local area network provided by an embodiment of the present invention.

Specifically, in one embodiment, as shown in FIG. 9, if the STA does not correctly receive an ACK of the transmitted data in the specified time slot within the reserved time period RAW, it means that the data packet is not transmitted successfully. At this time, if the number of retransmissions of the data packet does not reach the maximum number of retransmissions (may be a set parameter and is generally 7), the STA selects a corresponding time slot from another reserved time period after the reserved time period RAW within the current Beacon interval to retransmit the data packet.

Figure 10:
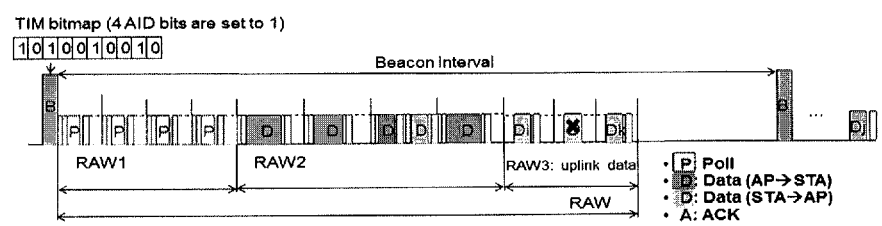
FIG. 10 is a schematic diagram of a method for transmitting data by an STA in a wireless local area network provided by an embodiment of the present invention.

In another embodiment, as shown in FIG. 10, the STA may also retransmit the data packet after the current Beacon interval.

In addition, it should be noted that, the reserved time period may be referred to as RAW, but is not limited to the name, meanwhile, FIG. 9 and FIG. 10 merely illustrate a retransmission manner when the uplink data may not be transmitted by examples, however, the name and the arrangement position of RAW3 are not necessarily the ones as shown in FIG. 9 and FIG. 10 and may be flexibly selected according to an actual demand.

Through the above technical solutions, the embodiment of the present invention provides a new mechanism to allow an STA to compete for a channel again to transmit uplink data, addressing a situation that unsuccessful transmission of data can not be handled during access to a CSMA/CA channel based on time slots. If the STA does not successfully transmit the uplink data to the AP in a specified time slot within a current time period, the STA reselects another time slot after the time period to retransmit the uplink data, so that the STA can still transmit data correctly when an ACK of the uplink data packet is lost or goes wrong, thereby improving the reliability of data transmission between the STA and the AP.

Finally, it should be noted that the preceding embodiments are merely used to illustrate the technical solutions of the present invention, rather than limiting the present invention; although the present invention is illustrated in detail with reference to the preceding embodiments, it should be understood for those of ordinary skill in the art that modifications may still be made to the technical solutions disclosed in the preceding embodiments, or equivalent alternations may be made to a part of technical features; and these modifications or alternations do not make the nature of the corresponding technical solutions departure from the scope of the technical solutions of the embodiments of the present invention.

What is claimed is:

1. A method for acquiring data by a station (STA) in a wireless local area network, for acquiring data by the STA from an access point (AP) which it accesses, comprising:
transmitting, by the STA, a PS-Poll, and receiving downlink data returned by the AP upon receipt of the PS-Poll, in a reserved time period within a current beacon interval according to a traffic indication map (TIM) contained in a beacon, after learning that the AP has the downlink data of the STA according to the received beacon, wherein the reserved time period is a period of time interval within the beacon interval;
retransmitting, by the STA, the PS-Poll after the reserved time period to acquire the downlink data, if the STA can not successfully receive the downlink data within the reserved time period.

2. The method of claim 1, wherein the retransmitting, by the STA, the PS-Poll after the reserved time period to acquire the downlink data comprises:
retransmitting, by the STA, the PS-Poll or a Trigger in another reserved time period after the reserved time period within the current beacon interval to acquire the downlink data, when the number of retransmissions of the PS-Poll by the STA does not reach the maximum number of retransmissions.

3. The method of claim 1, wherein the retransmitting, by the STA, the PS-Poll after the reserved time period to acquire the downlink data comprises:
retransmitting, by the STA, the PS-Poll or a Trigger within another beacon interval after the current beacon interval to acquire the downlink data, when the number of retransmissions of the PS-Poll by the STA does not reach the maximum number of retransmissions.

4. The method of claim 1, wherein the transmitting a PS-Poll and receiving downlink data returned by the AP upon receipt of the PS-Poll in a reserved time period within a current beacon interval according to a traffic indication map (TIM) contained in a beacon, comprises:
transmitting, by the STA, the PS-Poll in a first time slot in a reserved time period within the current beacon interval, and receiving the downlink data returned by the AP upon receipt of the PS-Poll in a second time slot in the reserved time period, according to an indication of the TIM.

5. The method of claim 1, wherein the transmitting, by the STA, the PS-Poll, and receiving downlink data returned by the AP upon receipt of the PS-Poll, in a reserved time period within a current beacon interval according to a traffic indication map (TIM) contained in a beacon comprise:
transmitting, by the STA, the PS-Poll in a first time slot in a reserved time period within the current beacon interval, and receiving the downlink data returned by the AP upon receipt of the PS-Poll in a second time slot in another reserved time period after the reserved time period, according to an indication of the TIM.

6. A data acquisition device, configured to acquire data from an access point (AP) in a wireless local area network, comprising:
a first transceiving unit, configured to, transmit a PS-Poll, and receive downlink data returned by the AP upon receipt of the PS-Poll in a reserved time period within a current beacon interval according to a traffic indication map (TIM) contained in a beacon, after learning that the AP has the downlink data of the data acquisition device according to the received beacon from the AP, wherein the reserved time period is a period of time interval within the beacon interval; and
a second transceiving unit, configured to, retransmit the PS-Poll after the reserved time period to acquire the downlink data, when the first transceiving unit can not successfully receive the downlink data within the reserved time period.

7. The data acquisition device of claim 6, wherein the second transceiving unit is configured to, retransmit the PS-Poll or a Trigger in another reserved time period after the reserved time period within the current beacon interval to acquire the downlink data, when the number of retransmissions of the PS-Poll by the data acquisition device does not reach the maximum number of retransmissions.

8. The data acquisition device of claim 6, wherein the second transceiving unit is configured to, retransmit the PS-Poll or a Trigger within another beacon interval after the current beacon interval to acquire the downlink data, when the number of retransmissions of the PS-Poll by the data acquisition device does not reach the maximum number of retransmissions.

9. The data acquisition device of claim 6, wherein the first transceiving unit is configured to, transmit the PS-Poll in a first time slot in a reserved time period within the current beacon interval according to the indication of the TIM, and receive the downlink data returned by the AP upon receipt of the PS-Poll in a second time slot within another reserved time period after the reserved time period.

10. The data acquisition device of claim 6, wherein the first transceiving unit is configured to transmit the PS-Poll in a first time slot in a reserved time period within the current beacon interval, and receive the downlink data returned by the AP upon receipt of the PS-Poll in a second time slot in another reserved time period after the reserved time period, according to an indication of the TIM.

11. A method for transmitting data by a station (STA) in a wireless local area network, for transmitting uplink data by the STA to an access point (AP) which it accesses, comprising:
receiving, by the STA, a beacon transmitted by the AP, and transmitting an uplink data packet in a corresponding time slot within a reserved time period indicated by the beacon, wherein the reserved time period is a period of time interval within the beacon interval; and
retransmitting, by the STA, the uplink data packet after the reserved time period if the number of retransmissions of the uplink data packet does not reach the maximum number of retransmissions, when the STA can not successfully transmit the uplink data packet within the reserved time period.

12. The method of claim 11, wherein the retransmitting, by the STA, the uplink data packet after the reserved time period comprises:
retransmitting, by the STA, the uplink data packet in another reserved time period after the reserved time period within the current beacon interval.

13. The method of claim 11, wherein the retransmitting, by the STA, the uplink data packet after the reserved time period comprises:
retransmitting, by the STA, the uplink data packet within another beacon interval after current beacon interval.

14. A data transmitting device configured to transmit uplink data to an access point (AP) which it accesses, comprising:
a receiving unit, configured to receive a beacon transmitted by the AP, and transmit an uplink data packet in a corresponding time slot within a reserved time period indicated by the beacon, wherein the reserved time period is a period of time interval within the beacon interval; and
a retransmitting unit, configured to retransmit the uplink data packet after the reserved time period if the number of retransmissions of the uplink data packet does not reach the maximum number of retransmissions, when the STA can not successfully transmit the uplink data packet within the reserved time period.

15. The data transmitting device of claim 14, wherein the retransmitting unit is configured to retransmit the uplink data packet in another reserved time period after the reserved time period within the current beacon interval.

16. The data transmitting device of claim 14, wherein the retransmitting unit is configured to retransmit the uplink data packet within another beacon interval after current beacon interval.

17. A method for acquiring data by a station (STA) in a wireless local area network, for acquiring data by the STA from an access point (AP) which it accesses, comprising:
transmitting, by the STA, an indicating frame and receiving downlink data returned by the AP upon receipt of the indicating frame, in a reserved time period within a current beacon interval according to a traffic indication map (TIM) contained in a beacon, after learning that the AP has the downlink data of the STA according to the received beacon, wherein the reserved time period is a period of time interval within the beacon interval, and the indicating frame is a PS-Poll, a trigger frame Trigger or uplink data data transmitted by the STA; and
retransmitting, by the STA, the indicating frame after the reserved time period to acquire the downlink data, if the STA can not successfully receive the downlink data within the reserved time period.

18. The method of claim 17, wherein
the retransmitting, by the STA, the indicating frame after the reserved time period to acquire the downlink data if the STA can not successfully receive the downlink data within the reserved time period comprises:
suspending, by the STA, the transmission of the indicating frame when a current reserved time slot ends; and
continuing, by the STA, to transmit the indicating frame to acquire the downlink data in a time period after the reserved time period within the current beacon interval.

19. The method of claim 17, wherein
the retransmitting, by the STA, the indicating frame after the reserved time period to acquire the downlink data if the STA can not successfully receive the downlink data within the reserved time period, comprises:
terminating, by the STA, the transmission of the indicating frame when a current reserved time slot ends; and
retransmitting, by the STA, the indicating frame to acquire the downlink data in a time period after the reserved time period within the current beacon interval.

20. A data acquisition device, configured to acquire data from an access point (AP) in a wireless local area network, comprising:
a first transceiving unit, configured to, after learning that the AP has the downlink data of the data acquisition device according to a received beacon from the AP, transmit an indicating frame, and receive downlink data returned by the AP upon receipt of the indicating frame in a reserved time period within a current beacon interval according to a traffic indication map (TIM) contained in a beacon, after learning that the AP has the downlink data of the data acquisition device according to the received beacon from the AP, wherein the reserved time period is a period of time interval within the beacon interval, and the indicating frame is a PS-Poll, a trigger frame (Trigger) or uplink data data transmitted by the STA; and
a second transceiving unit, configured to, retransmit the indicating frame after the reserved time period to acquire the downlink data, when the first transceiving unit can not successfully receive the downlink data within the reserved time period.

21. The device of claim 20, wherein the second transceiving unit is configured to:
suspend the transmission of the indicating frame when the current reserved time slot ends; and
continue to transmit the indicating frame to acquire the downlink data in a time period after the reserved time period within the current beacon interval or within another beacon interval after the current beacon interval.

22. The device of claim 20, wherein the second transceiving unit is configured to:
terminate the transmission of the indicating frame when the current reserved time slot ends; and
retransmit the indicating frame to acquire the downlink data in a time period after the reserved time period within the current beacon interval or within another beacon interval after the current beacon interval.

* * * * *